United States Patent
Liu et al.

(10) Patent No.: US 12,405,469 B2
(45) Date of Patent: Sep. 2, 2025

(54) HEAD MOUNTED DISPLAY AND DISPLAY DEVICE THEREOF

(71) Applicant: HTC Corporation, Taoyuan (TW)

(72) Inventors: Kuei-Chun Liu, Taoyuan (TW); Wei Chun Chen, Taoyuan (TW); Ching-Chia Chou, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 18/344,856

(22) Filed: Jun. 30, 2023

(65) Prior Publication Data

US 2025/0004274 A1 Jan. 2, 2025

(51) Int. Cl.
*G02B 27/01* (2006.01)
*G02B 27/28* (2006.01)

(52) U.S. Cl.
CPC ....... *G02B 27/0172* (2013.01); *G02B 27/283* (2013.01)

(58) Field of Classification Search
CPC ............ G02B 27/0172; G02B 27/283
See application file for complete search history.

(56) References Cited

U.S. PATENT DOCUMENTS

| | | | |
|---|---|---|---|
| 10,955,675 B1 * | 3/2021 | Wheelwright | G06F 1/3256 |
| 11,624,909 B2 * | 4/2023 | Rivera Cintron | G06F 1/3218 |
| | | | 345/7 |
| 11,778,149 B2 * | 10/2023 | Miller | G06V 40/19 |
| | | | 345/633 |
| 2018/0284464 A1 | 10/2018 | Lu et al. | |
| 2019/0384068 A1 | 12/2019 | Park et al. | |
| 2020/0249480 A1 | 8/2020 | Martinez et al. | |
| 2023/0367132 A1 * | 11/2023 | Cheng | G02B 27/0944 |

FOREIGN PATENT DOCUMENTS

| | | | | |
|---|---|---|---|---|
| CN | 114488529 | | 5/2022 | |
| CN | 114488529 A | * | 5/2022 | |
| CN | 114675417 | | 6/2022 | |
| CN | 114675417 A | * | 6/2022 | ............. G02B 27/01 |
| JP | 2012145738 | | 8/2012 | |
| WO | 2024014202 | | 1/2024 | |

OTHER PUBLICATIONS

"Office Action of Taiwan Counterpart Application", issued on Dec. 7, 2023, p. 1-p. 7.
"Office Action of Japan Counterpart Application", issued on Oct. 1, 2024, p. 1-p. 5.
"Office Action of Japan Counterpart Application", issued on Mar. 11, 2025, p. 1-p. 7.
"Office Action of Taiwan Counterpart Application", issued on May 28, 2025, p. 1-p. 8.

* cited by examiner

*Primary Examiner* — Doon Y Chow
(74) *Attorney, Agent, or Firm* — JCIPRNET

(57) ABSTRACT

A head mounted display and a display device thereof are provided. The display device includes a display and an image focus length adjuster. The display has a plurality of sub-regions. The sub-regions respectively transmit a plurality of image light beams with a plurality of different polarization directions. The image focus length adjuster is disposed adjacent to the display. The image focus length adjuster adjusts a focus length of each of the image light beams according to each of the polarization direction of each of the image light beams.

9 Claims, 4 Drawing Sheets

HEAD MOUNTED DISPLAY AND DISPLAY DEVICE THEREOF

BACKGROUND

Technical Field

The application relates to a head mounted display and a display device thereof, and in particular, to a head mounted display device capable of generating images with multiple depths of field and a display device thereof.

Description of Related Art

Whether the dizziness in virtual reality head-mounted display (VR HMD) (or smart eyewear) can be reduced is a very important indicator in optical products. Therefore, there are too many discussions on the design of multiple depths, such as, using multiple image planes to solve the problem of vergence-accommodation conflict can effectively help alleviate the visual discomfort of the head-mounted display. However, the architecture of multi-depth display often needs to increase many components and component volumes, making it difficult to balance the pursuit of visual anti-dizziness comfort, lightness and comfort of wearing, and affordable cost of consumer electronics.

SUMMARY

The application provides a display device and a display device thereof, which can generate display images with multiple depths of field.

The display device of the present invention includes a display and an image focus length adjuster. The display has a plurality of sub-regions. The sub-regions respectively transmit a plurality of image light beams with a plurality of different polarization directions. The image focus length adjuster is disposed adjacent to the display. The image focus length adjuster adjusts a focus length of each of the image light beams according to each of the polarization direction of each of the image light beams.

The head-mounted display of the present invention includes a body and the display device as described above.

Based on above, the display device of the present invention can generate multiple image light beams with different polarizations in multiple sub-regions through the display. Then, in conjunction with the polarization selective lens group that adjusts the focus length of each image light beam according to each polarizations of each image light beams, multiple parts of the display image can have image planes with different depths of field, so as to effectively produce image display effects with multiple depths of field.

DESCRIPTION OF THE EMBODIMENTS

Figure 1:
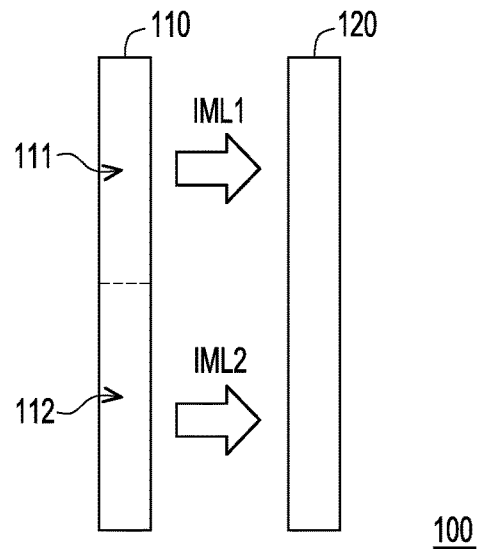
FIG. 1 is a schematic diagram of a display device according to an embodiment of the present invention.

Referring to FIG. 1, FIG. 1 is a schematic diagram of a display device according to an embodiment of the present invention. The display device 100 includes a display 110 and an image focus length adjuster 120. The display 110 and the image focus length adjuster 120 are arranged adjacently and overlap each other. The display 110 has a plurality of sub-regions 111 and 112. The display 110 is used to generate a display image, and transmit different image light beams IML1 and IML2 on different sub-regions 111 and 112 respectively. Among them, in the embodiment, the image light beams IML1 and IML2 can have various different polarization directions.

The image focus length adjuster 120 is used to receive the image light beams IML1 and IML2 transmitted by the display 110. The image focus length adjuster 120 can adjust the focus length of the image light beams IML1 and IML2 respectively according to the polarization directions of the image light beams IML1 and IML2. Since the polarization directions of the image light beams IML1 and IML2 are different, the image focus length adjuster 120 can make the image light beams IML1 and IML2 respectively have different the focus lengths. In this way, the image light beams IML1 and IML2 can be imaged on two image planes that do not overlap, and the display image has the effect of multiple depth of field.

In the embodiment, the display 110 can have two or more sub-regions. The two sub-regions 111, 112 shown in FIG. 1 are just an example for illustration, and is not intended to limit the implementation scope of the present invention.

Figure 2:
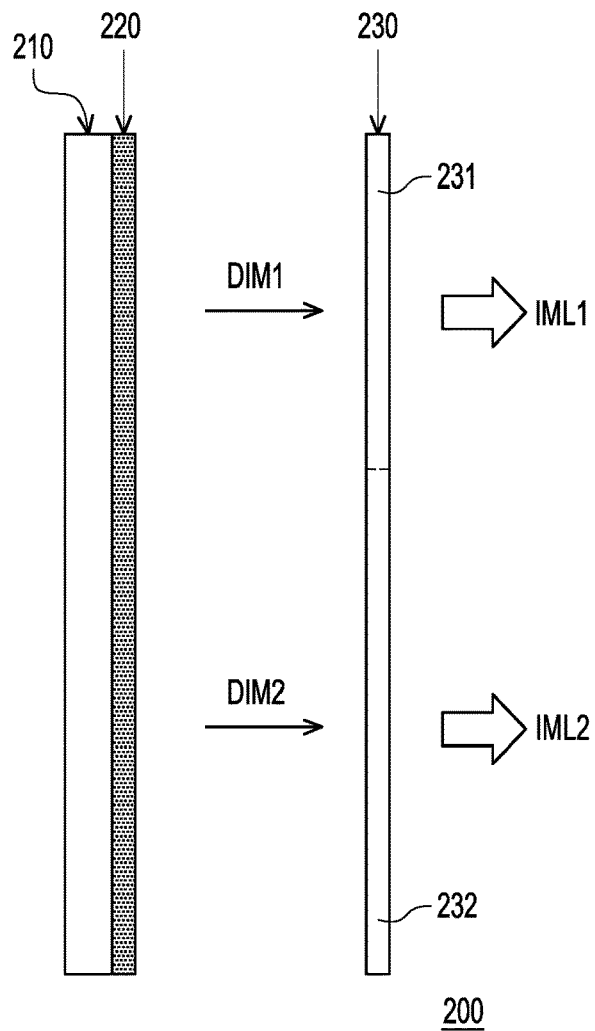
FIG. 2 is a schematic diagram of an implementation of the display in the display device in an embodiment of the present invention.

Referring to FIG. 2, FIG. 2 is a schematic diagram of an implementation of the display in the display device in an embodiment of the present invention. The display 200 includes a display panel 210, a polarizer 220, and a liquid crystal array substrate 230. The display panel 210 is used to generate a display image. The polarizer 220 and the display panel 210 are overlapped and used to receive the light beam of the display image generated by the display panel 210. In the embodiment, the polarizer 220 may be a linear polarizer for converting the polarization direction of the light beam of the display image generated by the display panel 210 to be parallel to a linear transmission axis of the polarizer 220. In the embodiment, the polarizer 220 may be in contact with the surface of the display panel 210 generating the light beam of the display image.

Besides, the liquid crystal array substrate 230 is arranged adjacent to the polarizer 220. The liquid crystal array substrate 230 may have multiple liquid crystal regions 231 and 232. The display panel 210 and the polarizer 220 can transmit sub-region images DIM1 and DIM2 for the liquid crystal regions 231 and 232 respectively. The liquid crystal regions 231 and 232 respectively control the polarization directions of the sub-region images DIM1 and DIM2 to generate the image light beams IML1 and IML2.

In detail, the liquid crystal regions 231 and 232 can respectively receive a control voltage, and determine whether to adjust the polarization directions of the sub-region images DIM1 and DIM2 according to the state of receiving the control voltage. For example, when the liquid crystal region 231 receives a control voltage, the liquid crystal array in the liquid crystal region 231 can deflect, and make the sub-region image DIM1 pass directly to generate the image light beam IML1. Under such conditions, the polarization direction of the sub-region image DIM1 is not adjusted and remains unchanged. On the other hand, when the liquid crystal region 232 does not receive the control voltage, the liquid crystal array in the liquid crystal region 232 does not deflect, and can cause the polarization direction of the sub-region image DIM2 to rotate at a preset angle to generate the image light beam IML2. In the embodiment, the preset angle is, for example, 90 degrees. In this way, the image light beams IML1 and IML2 can have different polarization directions.

Similar to the embodiment of FIG. 1, the number of the liquid crystal regions that the liquid crystal array substrate 230 has can be two or more than two. The two liquid crystal regions 231, 232 of the liquid crystal array substrate 230 shown in FIG. 2 are just an example for illustration, and is not intended to limit the implementation scope of the present invention. Besides, the liquid crystal array substrate 230 in the embodiment of the present invention may be a twisted nematic (TN) liquid crystal array.

Figure 3:
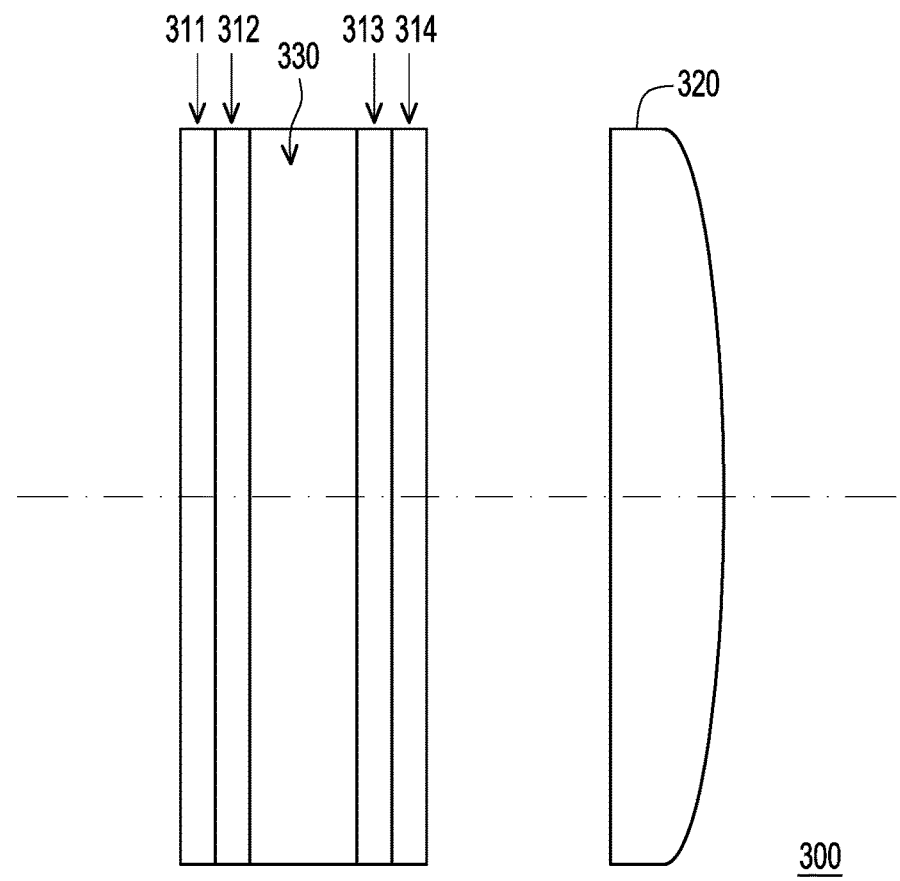
FIG. 3 is a schematic diagram of an implementation of an image focus length adjuster of the display device according to an embodiment of the present invention.

Referring to FIG. 3 below, FIG. 3 is a schematic diagram of an implementation of an image focus length adjuster of the display device according to an embodiment of the present invention. In the embodiment, the image focus length adjuster 300 is a polarization path selective lens group. The image focus length adjuster 300 can be used to adjust a light traveling path of image light beams. The image focus length adjuster 300 includes a first optical retarder 311, a beam splitter 312, a second optical retarder 313, a reflective linear polarizer 314, and a lens group 320. The first optical retarder 311 and the beam splitter 312 are arranged overlapping each other, the first optical retarder 311 is used to receive the image light beams from the display. The second optical retarder 313 is overlapped with the reflective linear polarizer 314. Among them, the second optical retarder 313 has a light incident surface corresponding to a light emitting surface of the beam splitter 312. There may be a medium 330 between the second optical retarder 313 and the beam splitter 312. In the embodiment, the medium 330 can be an air medium.

It should be noted that the reflective linear polarizer 314 can produce different effects on the image light beams of different polarization directions. For example, the reflective linear polarizer 314 can produce a reflection effect on the image light beam with a first polarization direction, and the reflective linear polarizer 314 can produce a transmission effect on the image light beam with a second polarization direction. Among them, the first polarization direction and the second polarization direction are not the same. Accordingly, the reflective linear polarizer 314 can adjust the light traveling path of the image light beam according to the polarization direction of the image light beam, and further adjust the focus length and the imaging position of the image light beam.

Specifically, when the image light beam entering the image focus length adjuster 300 is in the first polarization (linear polarization) direction, the first retarder 311 can convert the image light beam into a first circular polarization. Then through the beam splitter 312 and the second retarder 313, the image light beam can be converted into the first polarization direction. Moreover, the reflective linear polarizer 314 can reflect the image light beam of the first polarization direction, and the retarder 313 converts the reflected image light beam into the first circular polarization. Next, the image light beam is transmitted to the beam splitter 312, and the beam splitter 312 can reflect the image light beam of the first circular polarization to the retarder 313. This time, the retarder 313 converts the image light beam to the second polarization (linear polarization) direction and makes the image light beam penetrate the reflective linear polarizer 314.

On the other hand, when the image light beam entering the image focus length adjuster 300 is in the second polarization (linear polarization) direction, the first retarder 311 can convert the image light beam into a second circular polarization, and then turn to the second polarization direction through the beam splitter 312 and the second retarder 313. In this way, the image light beam can pass through the reflective linear polarizer 314 directly.

Incidentally, in the embodiment, the first optical retarder 311 and the second optical retarder 313 can be ¼ optical retarder.

In addition, the lens group 320 is adjacent to the light emitting surface of the reflective linear polarizer 314 for setting. The lens group 320 is used to receive the image light beam and generate the imaging image.

According to the above description, it can be known that the image focus length adjuster 300 can perform adjustment actions in different degrees according to the light traveling paths of image light beams of different polarization directions. And to make the image light beams with different polarization directions image in different image planes, so as to enhance the depth of field level of the display image.

Figures 4A, 4B:
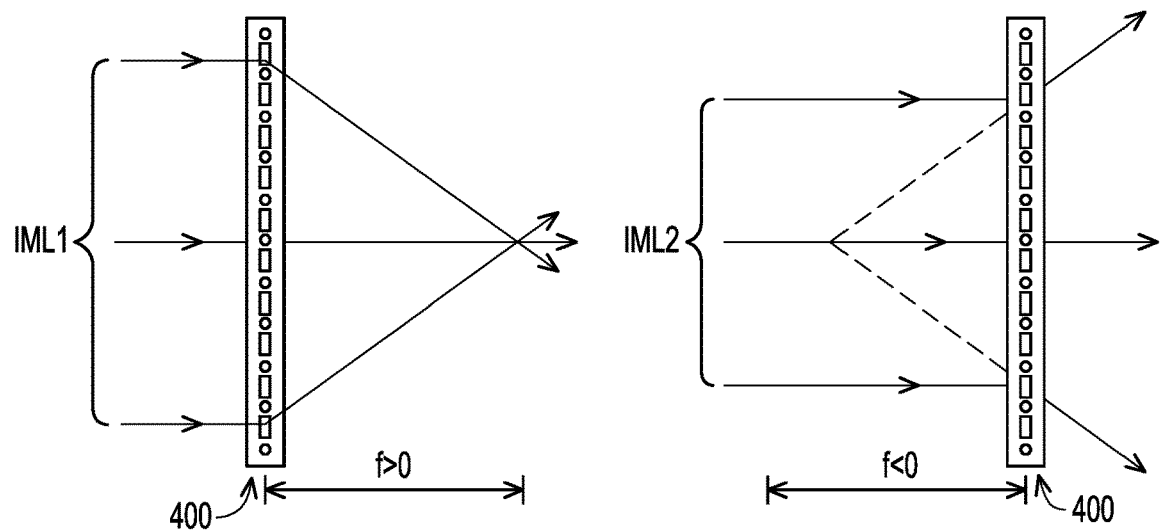
FIG. 4A and FIG. 4B are respectively schematic diagrams of an implementation of an image focus length adjuster of the display device according to an embodiment of the present invention.

Referring to FIG. 4A below, FIG. 4A is a schematic diagram of an implementation of an image focus length adjuster of the display device according to an embodiment of the present invention. In the embodiment, the image focus length adjuster 400 is polarization directed lens. In the embodiment, the image focus length adjuster 400 can be constructed from the liquid crystal array substrate. The image focus length adjuster 400 can have different focus lengths in different polarization through a special liquid crystal alignment. In FIG. 4A, the focus length f is a value greater than 0, and the image focus length adjuster 400 can make the received light traveling path of the image light beam IML1 in a focused state.

In FIG. 4B, the focus length f is a value less than 0, the image focus length adjuster 400 can make the received light traveling path of the image light beam IML2 into a defocused state; wherein the image light beams IML1 and IML2 have different polarization directions.

Figure 5A:
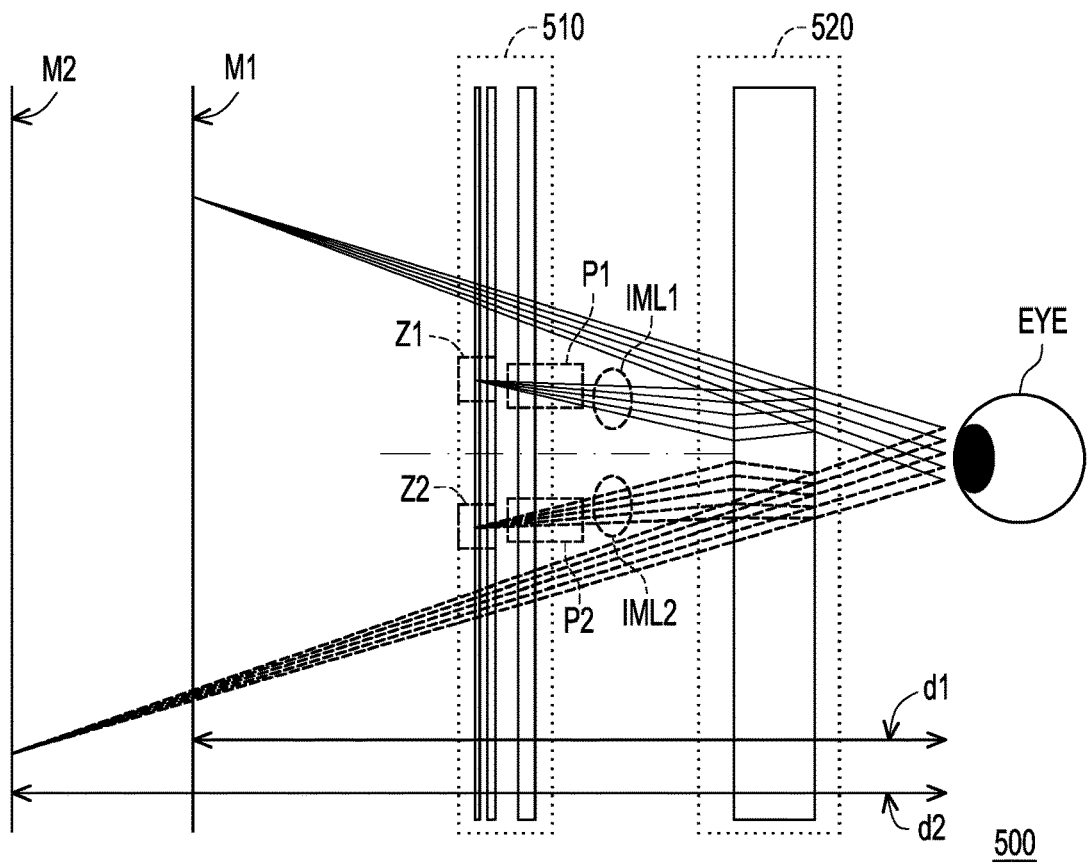
FIG. 5A is a schematic diagram of the display device according to another embodiment of the present invention.
Figure 5B:
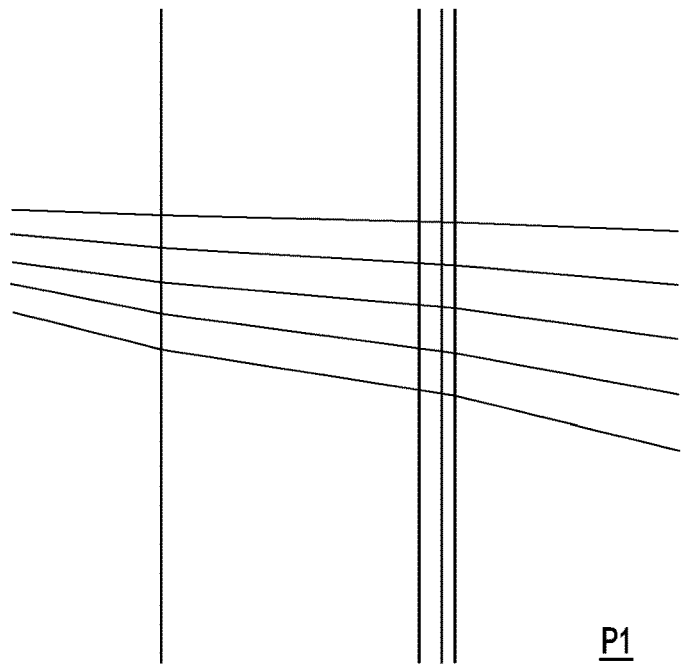
FIG. 5B and FIG. 5C are respectively light traveling path diagrams of image light beams with different polarization directions in the display device.
Figure 5C:
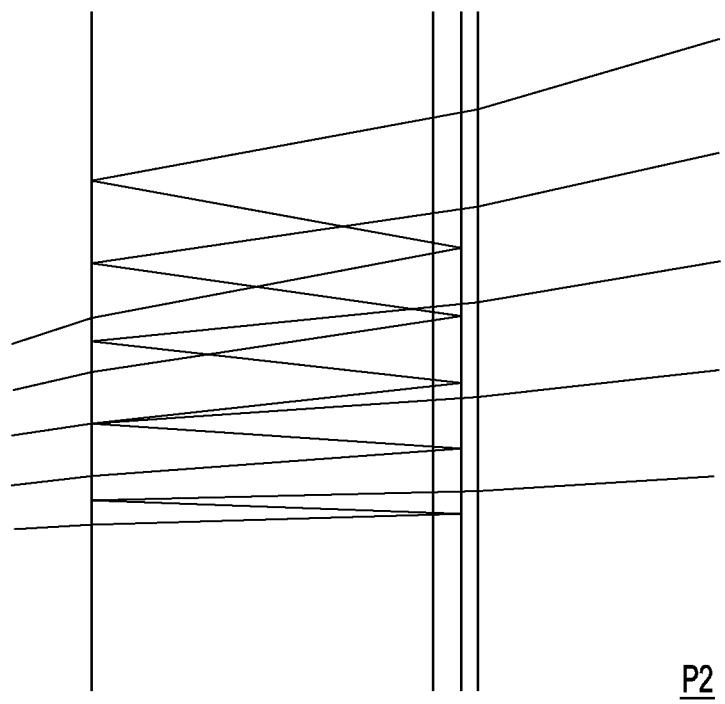

Referring to FIG. 5A to FIG. 5C, FIG. 5A is a schematic diagram of the display device according to another embodiment of the present invention. FIG. 5B and FIG. 5C are respectively light traveling path diagrams of image light beams with different polarization directions in the display device. The display device 500 includes a display 510 and an image focus length adjuster 520. The display 510 is arranged adjacent to the image focus length adjuster 520. The display 510 can have multiple sub-regions Z1 and Z2, and the sub-regions Z1 and Z2 can respectively generate multiple image light beams IML1 and IML2 with different polarization directions. Among them, the polarization direction of the image light beam IML1 and the polarization direction of the image light beam IML2 are orthogonal to each other. The details of a light traveling path P1 of the image light beam IML1 can be shown in FIG. 5B, wherein the image light beam IML1 can travel through multiple refractions. The details of a light traveling path P2 of the image light beam IML2 can be shown in FIG. 5C, wherein the image light beam IML2 can travel through two reflections and multiple refractions.

Through the image focus length adjuster 520 adjusting the light traveling paths of the image light beam IML1 and the image light beam IML2, the image light beam IML1 can form a first virtual image on the image plane M1; the image light beam IML2 can form a second virtual image on the image plane M2. Among them, the image plane M1 does not overlap with the image plane M2. Relative to the position of the eyeball EYE of the observer, the first virtual image corresponding to the image light beam IML1 may have an image distance d1, and the second virtual image corresponding to the image light beam IML2 may have an image distance d2. Among them, the image distance d1 is less than the image distance d2.

It can be known from the above description that the display device 500 generates the image light beams with different polarization directions for the display image of different sub-regions by the display device 510. Then, the image focus length adjuster 520 is used to adjust the focus length of the image light beams according to the polarization directions. In this way, in the display image, display objects corresponding to different sub-regions can be imaged on image planes with different image distances. The display image generated by the display device 500 can have multiple depths of field, which can effectively improve the display quality of the display image.

Figure 6:
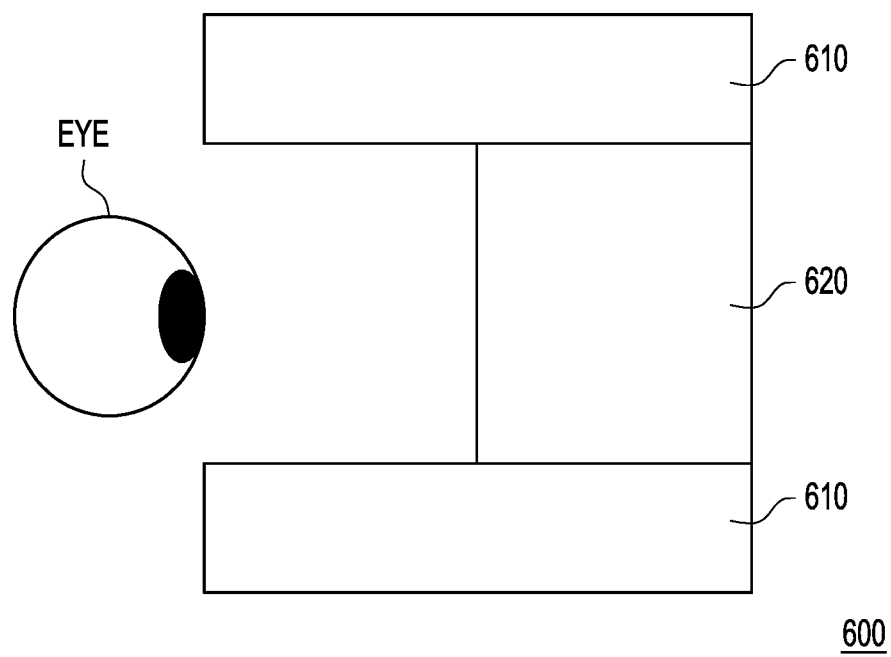
FIG. 6 is a schematic diagram of a head-mounted display according to an embodiment of the present invention.

Referring to FIG. 6 below, FIG. 6 is a schematic diagram of a head-mounted display according to an embodiment of the present invention. The head-mounted display 600 includes a body 610 and a display device 620. The display device 620 is set in the body 610 and is used to project a display image to the user's eyeball EYE.

The display device 620 can be implemented by applying the display device 100 or 500 of the foregoing embodiments. The implementation details of the display device 620 have been described in detail in the aforementioned multiple embodiments and implementation manners, and will not be repeated here.

It is worth mentioning that the setting position of the display device 620 in the body 610 can be moderately adjusted according to the mechanism setting of the head-mounted display 600. FIG. 6 is shown as an example for illustration only, and is not intended to limit the implementation scope of the present invention.

In summary, in the display device of the present invention, the image light beams with different polarization directions are generated by the display, and then the focus length of the image light beams are adjusted by the image focus length adjuster according to the polarization directions. In this way, the imaging image distance of each part of the display image can be effectively controlled, the display image with multiple depths of field can be effectively generated, and the display quality can be improved.

What is claimed is:

1. A display device, comprising:
   a display, having a plurality of sub-regions, the sub-regions respectively transmit a plurality of image light beams with a plurality of different polarization directions; and
   an image focus length adjuster, disposed adjacent to the display, adjusts a focus length of each of the image light beams according to each of the polarization directions of each of the image light beams;

wherein the display comprises:
   a display panel, configured to generate a display image;
   a polarizer, disposed overlapping with the display panel, is configured to convert a polarization state of the display image; and
   a liquid crystal array substrate, disposed adjacent to the polarizer, has a plurality of liquid crystal regions respectively corresponding to the sub-regions, and the liquid crystal regions respectively receive a plurality of sub-region images of the display image, and control a polarization direction of the sub-region images to generate the image light beams respectively, wherein the image focus length adjuster is a polarization selective lens group, the polarization selective lens group comprises:
   a first optical retarder, configured to receive the image light beams;
   a beam splitter, overlapped with the first optical retarder;
   a second optical retarder, disposed adjacent to the beam splitter; and
   a reflective linear polarizer, overlapped with the second optical retarder, configured to reflect or transmit each of the image light beams according to each of the polarization directions of each of the image light beams.

2. The display device according to claim 1, wherein each of the liquid crystal regions of the liquid crystal array receives a corresponding control voltage, and rotates each of the polarization directions of each of the image light beams by a preset angle according to the control voltage.

3. The display device according to claim 2, wherein when each of the liquid crystal regions does not receive the control voltage, each of the liquid crystal regions maintains each of the polarization directions of each of the image light beams unchanged.

4. The display device according to claim 1, wherein the image focus length adjuster adjusts a light traveling path of each of the image light beams according to each of the polarization directions of each of the image light beams.

5. The display device according to claim 1, wherein there is a medium between the second optical retarder and the beam splitter.

6. The display device according to claim 1, wherein the polarization selective lens group further comprises:
   a lens group, arranged adjacent to a light-emitting surface of the reflective linear polarizer.

7. The display device according to claim 1, wherein the image focus length adjuster is a polarization direction lens.

8. The display device according to claim 1, wherein a first sub-region of the display transmits a first image light beam having a first polarization direction, a second sub-region of the display transmits a second image light beam having a second polarization direction, the polarization selective lens group adjusts a transmission path of the first image light beam according to the first polarization direction of the first image light beam, and controls the first image light beam to image on a first plane, the polarization selective lens group adjusts a transmission path of the second image light beam according to the second polarization direction of the second image light beam, and controls the second image light beam to image on a second plane, wherein the first plane does not overlap with the second plane.

9. A head-mounted display, comprising:
a body; and
a display device according to claim 1, disposed in the body.

* * * * *